Patented June 12, 1928.

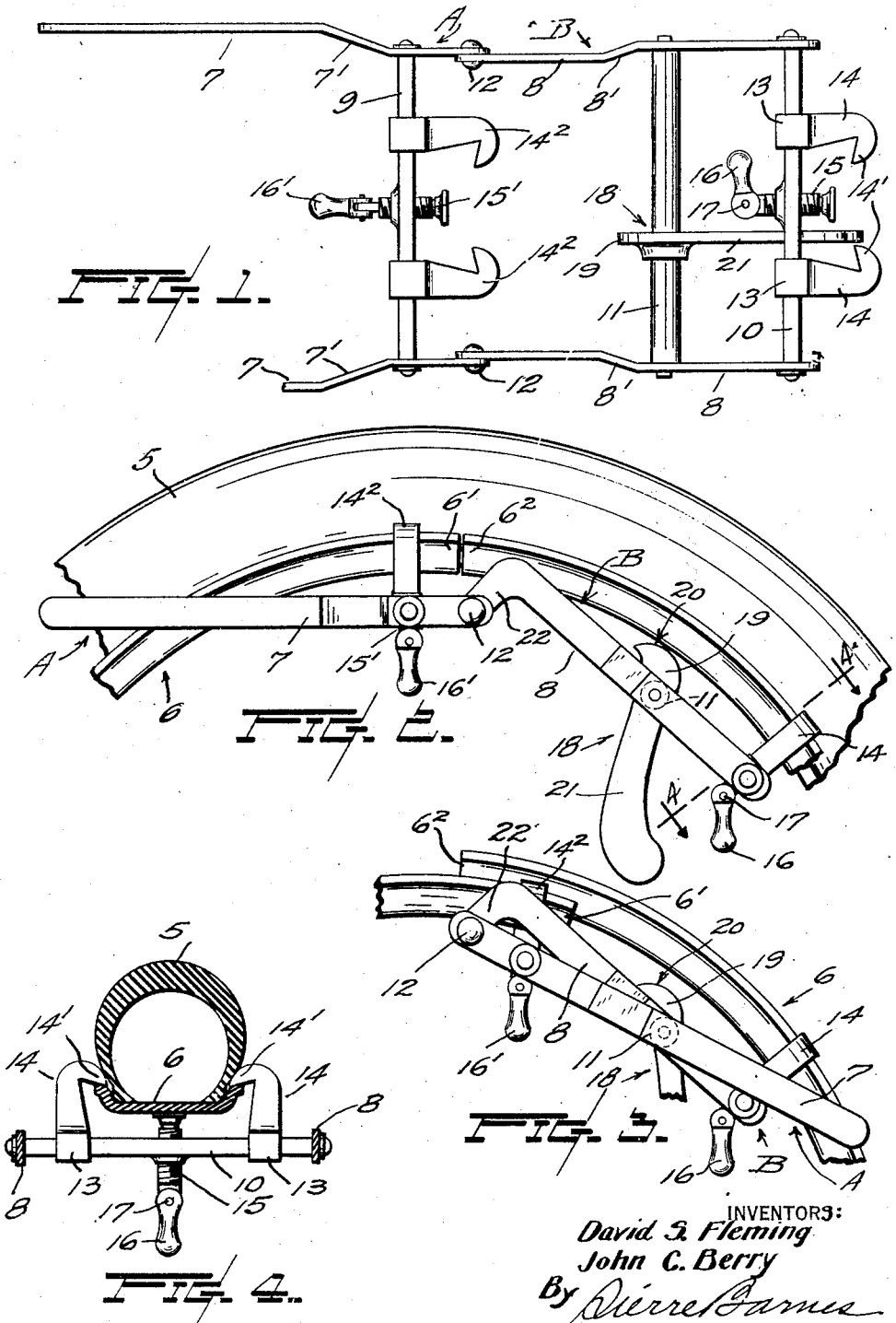

1,673,388

UNITED STATES PATENT OFFICE.

JOHN C. BERRY, OF BERKELEY, CALIFORNIA, AND DAVID S. FLEMING, OF SEATTLE, WASHINGTON.

RIM-REMOVING DEVICE.

Application filed May 25, 1926. Serial No. 111,503.

This invention relates to that type of tire changers which are utilized for contracting split-rims for the purpose of removing the same from a pnuematic tire.

The object of our invention, generally stated, is to provide a simple and inexpensively constructed rim remover which will be strong and durable, and which will be convenient and efficient in operation.

More specific objects and advantages of the invention will appear in the following description.

The invention is illustrated in the accompanying drawing, in which,—

Figure 1 is a plan view of the rim-remover showing the several parts spread out in a plane. Fig. 2 is a side elevation of the device shown applied to a rim preparatory to contracting the same from within a tire. Fig. 3 is a view similar to Fig. 2 with the tire omitted and illustrating the parts in the relative positions which they occupy when the rim is in its contracted condition. Fig. 4 is a transverse section taken substantially on line 4—4 of Fig. 2.

In said drawing, the reference numeral 5 designates a portion of a pneumatic tire and 6 is the rim upon which the tire is mounted. Said rim is of the "split" type having two meeting ends $6^1$ and $6^2$.

The present invention comprises two hingedly connected frame members A and B. Said members are formed with longitudinal side rails 7 and 8 which are respectively held in spaced apart relation by means of transverse bars 9 and 10, 11.

The side bars of both members are pivotally connected by riveted pins 12 and to permit the two members to be folded one over the other the respective side rails are formed with bent portions $7^1$ and $8^1$ as shown in Fig. 1.

The member B, hereinafter designated as the body member, has the transverse bar 10 thereof disposed in proximity to the free end of the member. The bar 10 has a rectangular portion between the side rails 8 and cylindrical extremities engaging in said side rails to permit the rotation of the bar.

Mounted upon the bar 10 for movement endwise thereof are two sleeves 13 having rectangular apertures which prevent any relative turning of the sleeves with respect to the bar. Formed integral with the respective sleeves are hooks 14 having their bill elements $14^1$ directed toward each other.

Centrally of its length the bar 10 is provided with a screw threaded hole engaging in which is a clamping screw 15 which is disposed in the plane of said hooks. The clamping screw 15 is provided with an operating handle 16 which, as shown, is connected by a pivot 17 with the screw. The other bar element 11 of member B has a cylindrical portion between the side rails 8 and upon which a dog 18 is mounted for both rotary and axial movements. Said dog is provided at one side of the bar 11 with a short arm 19 having rounded nose 20, and at the other side of the bar it is provided with a long arm 21 of sufficient weight to normally hold the short arm uppermost as shown in Fig. 2.

The ends of the side rails 8 which are connected to the member A have each, in side elevation, a bend to provide a downwardly directed arm as 22 for the purpose of offsetting the axis of the pins 12 which pivotally connect the two members together.

The member A, hereinafter designated as the lever member, has its bar element 9 located in proximity to the axis of the pins 12.

The bar 9 is similar to the bar 10, above described, and in like manner is provided with a centrally disposed clamping screw $15^1$, having an operating handle $16^1$ and two hooks $14^2$ which are sleeved upon the bar for movements transversely of the device.

The device is most conveniently used with the tire resting upon the ground or floor in a vertical position and with the "break" between the ends $6^1$ and $6^2$ of the rim at the top.

The device is applied by engaging the member A to the rim at a short distance— say, an inch or two—from the extremity of the end $6^1$. Such engagement being effected by catching the bills of the hooks $14^2$ over the top of the side flanges of the rim and screwing up the clamping screw $15^1$ against the under side of the rim end, thereby firmly clamping the rim between said hooks and the clamping screw.

The rim, in like manner, is engaged between the hooks 14 and clamping screw 15 of the member B to connect the latter to the rim as represented in Fig. 2. With the members thus arranged the dog 18 will occupy a position substantially as shown in Fig. 2.

The operator standing at the left hand side in Fig. 2 rolls the work—i. e., the tire rim—toward him, causes the dog arm 19 to be brought into contact with the inner periphery of the rim. The operator thereupon swings the lever member A downwardly below the axis of the pivot pins 12, then kicking against the dog arm 21 to dislodge the arm 19 from its engagement with the rim and, finally, swinging the lever member A upwardly into its Fig. 3 position.

In thus actuating the lever member the same is swung about the axis of the pins 12 to carry the rim end $6^1$ downwardly and then circumferentially of the rim to below the other end $6^2$ of the rim, see Fig. 3.

When thus arranged the lever member A is positioned to have the plane of the axes of the pins 12 and of the bar 9 above the plane of the axis of the bar 10, thereby securing the device in position to retain the rim in its contracted condition, suitable for removing from a tire.

The device is readily operated, requiring but little labor, and effects its function without distorting, or permanently springing the rim out of shape.

In attaching the device to a rim, the respective hooks are freely slidable toward each other into engageable relations with the rim and to which they are held by the clamping screws. The axes of the clamping screws, moreover, are in the planes of the axes of the respective hooks whereby the associated hooks and clamping screws are held radial of the arc of the rim whereat they are engaged.

Furthermore, the hooks and clamping screw of the body member cooperate with the dog to hold this member rigid when subjected to the stress due to forcing the rim end $6^1$ downwardly through the instrumentality of the lever member.

The construction and manner of employing our invention will, it is throught be understood from the foregoing description.

What we claim, is,—

1. A rim-remover of the character described comprising a body member and a lever member foldably connected together, said members being each provided with side rails and a transversely arranged bar element connected at its ends for rotary movement to the respective side rails, each of said bars being provided centrally of its length with a screw threaded hole, clamping screws extending through the respective holes and engaging the screw threads therein, a hook disposed upon each of said bars at opposite sides of the respective clamping screw, said hooks being rotatable as a unit with the bars and adapted for movement lengthwise of the bars, a second transverse bar connected to the side rails of said body member, and a dog mounted upon the last named bar for relative rotary and endwise movements.

2. In a rim-remover, complementary frame members severally provided with side rails and transverse bar elements which are mounted at their ends for rotary movements to the side rails of the respective member, said bar elements being provided with screw threaded holes, clamping screws extending through screw threaded holes of the respective bars, and hook devices mounted upon the respective bars and held by the latter to have the longitudinal axes of the hooks in planes with the axes of said screws upon the respective bars, said hooks being freely movable endwise of the bars.

Signed at Seattle, Washington, this 2nd day of April, 1926.

JOHN C. BERRY.
DAVID S. FLEMING.